United States Patent
Valenziano et al.

(10) Patent No.: US 7,549,474 B2
(45) Date of Patent: Jun. 23, 2009

(54) SERVICING A WELLBORE WITH AN AQUEOUS BASED FLUID COMPRISING A CLAY INHIBITOR

(75) Inventors: Rob Valenziano, Magnolia, TX (US); Kirk L. Harris, Midland, TX (US); Mark D. Dixon, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/382,757

(22) Filed: May 11, 2006

(65) Prior Publication Data

US 2007/0261849 A1 Nov. 15, 2007

(51) Int. Cl.
*E21B 33/16* (2006.01)

(52) U.S. Cl. ........................ 166/291; 507/225
(58) Field of Classification Search ................. 166/291; 507/225
See application file for complete search history.

(56) References Cited

U.S. PATENT DOCUMENTS

| | | | |
|---|---|---|---|
| 2,582,909 A | 1/1952 | Laurence | |
| 3,640,343 A | 2/1972 | Darley | |
| 3,646,997 A | 3/1972 | Chenevert | |
| 3,679,001 A | 7/1972 | Hill | |
| 3,738,437 A | 6/1973 | Scheuerman | |
| 3,746,109 A | 7/1973 | Darley | |
| 3,843,524 A | 10/1974 | Perricone et al. | |
| 3,878,895 A | 4/1975 | Wieland et al. | |
| 3,931,096 A | 1/1976 | Guilbault et al. | |
| 4,045,357 A | 8/1977 | Reed | |
| 4,102,400 A | 7/1978 | Crinkelmeyer et al. | |
| 4,141,843 A * | 2/1979 | Watson | 507/207 |
| 4,142,595 A | 3/1979 | Anderson et al. | |
| 4,190,110 A | 2/1980 | Beirute | |
| 4,276,182 A | 6/1981 | Beirute | |
| 4,366,071 A | 12/1982 | McLaughlin et al. | |
| 4,393,939 A | 7/1983 | Smith et al. | |
| 4,440,649 A | 4/1984 | Loftin et al. | |
| 4,447,342 A | 5/1984 | Borchardt et al. | |
| 4,460,627 A | 7/1984 | Weaver et al. | |
| 4,462,718 A | 7/1984 | McLaughlin et al. | |
| 4,490,261 A | 12/1984 | Heilweil | |
| 4,498,994 A | 2/1985 | Heilweil | |
| 4,514,310 A | 4/1985 | Heilweil | |
| 4,536,297 A | 8/1985 | Loftin et al. | |
| 4,588,032 A * | 5/1986 | Weigand et al. | 166/291 |
| 4,693,639 A | 9/1987 | Hollenbeak et al. | |
| 4,741,843 A | 5/1988 | Garvey et al. | |
| 4,757,862 A | 7/1988 | Naiman et al. | |
| 4,792,412 A | 12/1988 | Heilweil | |
| 4,941,981 A | 7/1990 | Perricone et al. | |
| 4,988,450 A | 1/1991 | Wingrave et al. | |
| 5,038,863 A | 8/1991 | Bloys et al. | |
| 5,097,904 A | 3/1992 | Himes | |
| 5,113,943 A * | 5/1992 | Wilson et al. | 166/291 |
| 5,134,118 A | 7/1992 | Patel et al. | |
| 5,197,544 A | 3/1993 | Himes | |
| 5,198,415 A | 3/1993 | Steiger | |
| 5,208,216 A | 5/1993 | Williamson et al. | |
| 5,232,497 A | 8/1993 | Dillenbeck et al. | |
| 5,368,103 A | 11/1994 | Heathman et al. | |
| 5,402,849 A | 4/1995 | Jennings, Jr. | |
| 5,607,902 A | 3/1997 | Smith et al. | |
| 5,866,517 A * | 2/1999 | Carpenter et al. | 507/226 |
| 6,012,524 A | 1/2000 | Chatterji et al. | |
| 6,020,289 A * | 2/2000 | Dymond | 507/120 |
| 6,063,737 A * | 5/2000 | Haberman et al. | 507/261 |
| 6,176,315 B1 | 1/2001 | Reddy et al. | |
| 6,204,224 B1 | 3/2001 | Quintero et al. | |
| 6,378,363 B1 | 4/2002 | Hache et al. | |
| 6,422,325 B1 | 7/2002 | Krieger | |
| 6,427,785 B2 | 8/2002 | Ward | |
| 6,703,351 B2 | 3/2004 | Stowe, II et al. | |
| 6,772,835 B2 | 8/2004 | Rogers et al. | |
| 6,910,535 B2 | 6/2005 | Tare et al. | |
| 6,994,164 B2 | 2/2006 | Tare et al. | |
| 6,997,270 B2 | 2/2006 | Mody et al. | |
| 2004/0045712 A1 | 3/2004 | Eoff et al. | |
| 2004/0204323 A1 | 10/2004 | Temple et al. | |
| 2004/0235674 A1 | 11/2004 | Youngson et al. | |
| 2005/0022990 A1 | 2/2005 | Chatterji et al. | |
| 2005/0039920 A1 | 2/2005 | Tare et al. | |
| 2005/0080161 A1 | 4/2005 | Tare et al. | |
| 2005/0178295 A1 | 8/2005 | Caveny et al. | |
| 2006/0032407 A1 | 2/2006 | Chatterji et al. | |

FOREIGN PATENT DOCUMENTS

| | | |
|---|---|---|
| EP | 0430644 A1 | 6/1991 |
| WO | 2005061652 A1 | 7/2005 |
| WO | 2005103194 A1 | 11/2005 |

OTHER PUBLICATIONS

Halliburton brochure entitled "Barite Heavyweight Additive" dated 1999.
Baroid brochure entitled "Baracat® Shale Stabilizer" dated 2002.
Baroid brochure entitled "Baro-Trol® Plus" dated 2000.
Baroid brochure entitled "Clay Grabber® Flocculant" dated 2005.
Baroid brochure entitled "Clayseal® " Shale Stabilizer dated 2002.
Baroid brochure entitled "Clay Sync™ Shale Stabilizer" dated 2005.
Baroid brochure entitled "EZ-Mud® Shale Stabilizer" dated 2002.

(Continued)

*Primary Examiner*—William P Neuder
(74) *Attorney, Agent, or Firm*—Craig W. Roddy; Conley Rose, P.C.

(57) ABSTRACT

A method of servicing a wellbore in contact with a subterranean formation comprising placing an aqueous composition comprising a mud displacement fluid and a clay inhibitor into the wellbore. An aqueous composition for servicing a wellbore comprising a mud displacement fluid and a clay inhibitor. A method of servicing a wellbore comprising introducing an aqueous wellbore servicing fluid comprising a clay inhibitor, thereby inhibiting the swelling of an argillaceous subterranean formation penetrated by the wellbore.

22 Claims, No Drawings

OTHER PUBLICATIONS

Baroid brochure entitled "GEM™ 2000 Shale Stabilizer" dated 2002.
Halliburton brochure entitled "Hi-Dense® Weight Additives" dated 1998.
Halliburton brochure entitled "Micromax Weight Additive" dated 2005.
Baroid brochure entitled "Performatrol® Shale Stabilizer" dated 2005.
Tan, Chee et al., "Novel High Membrane Efficiency Water-Based Drilling Fluids for Alleviating Problems in Troublesome Shale Formations" IADC/SPE 77192 dated 2002.
Mody, Fersheed et al., "Development of Novel Membrane Efficient Water-Based Drilling Fluids Through Fundamental Understanding of Osmotic Membrane . . . ", SPE 77447 dated 2002.
Tan, C.P. et al., "Development and Laboratory Verification of High Membrane Efficiency Water-Based Drilling Fluids with Oil-Based Drilling . . . " SPE/ISRM 78159 dated 2002.
Nesbitt, L.E. et al., "Shale Stabilization Principles" SPE 14248 dated 1985.
Tare, U.A. et al., "Mitigating Wellbore Stability Problems while Drilling with Water-Based Muds In Deepwater Environments" OTC 14267 dated 2002.
Heathman, J., et al., "Understanding Formation (In) Stability During Cementing," SPE/IADC 79913, Drilling Conference, Feb. 2003, 15 pgs.
Schlemmer, R., et al., "Progression of Water-Based Fluids Based on Amine Chemistry—Can the Road Lead to True Oil Mud Replacements?" AADE-03-NTCE-36, Technical Conference, Apr. 2003, pp. 1-14.
"Shale Stabilizer," Baroid Fluid Services—Clay Sync™ , http://is.myhalliburton.com/contents/default/main/myhalliburton/customer_content/bar/cont..., Jun. 8, 2005, pp. 1-2.
"Barasil™ —S Shale Stabilizer," Baroid Fluid Services, http://is.myhalliburton.com/contents/default/main/myhalliburton/customer_content/bar/cont..., Jun. 8, 2005, pp. 1-2.
"Hydro-Guard® System Inhibitive Water-Based Fluid," http://www.halliburton.com/esg/sd1378.jsp, Jun. 15, 2005, pp. 1-2.
Foreign Communicatioin from a related counterpart application—International Search Report and Written Opinion, PCT/GB2007/001750, Jan. 18, 2008, 15 pages.

* cited by examiner

SERVICING A WELLBORE WITH AN AQUEOUS BASED FLUID COMPRISING A CLAY INHIBITOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention generally relates to wellbore servicing fluids and methods of servicing a wellbore. More specifically, this invention relates to methods of servicing a wellbore using an aqueous fluid comprising a clay inhibitor.

2. Background of the Invention

Natural resources such as gas, oil, and water residing in a subterranean formation or zone are usually recovered by drilling a wellbore down to the subterranean formation while circulating a drilling fluid (also known as a drilling mud) through the drill pipe and the drill bit and upwardly through the wellbore to the surface. The drilling fluid serves to lubricate the drill bit and carry drill cuttings back to the surface. After the wellbore is drilled to the desired depth, the drill pipe and drill bit are typically withdrawn from the wellbore while the drilling fluid is left in the wellbore to provide hydrostatic pressure on the formation penetrated by the wellbore and thereby prevent formation fluids from flowing into the wellbore. The next operation in completing the wellbore usually involves running a string of pipe, e.g., casing, in the wellbore. Primary cementing is then typically performed whereby a cement slurry is pumped down through the string of pipe and into the annulus between the string of pipe and the walls of the wellbore to allow the cement slurry to set into a hard mass (i.e., sheath), and thereby seal the annulus.

A large percentage of drilled formations are comprised of argillaceous formations like shales. Shales refer to a loosely defined heterogeneous argillaceous material ranging from clay-rich gumbo to shale siltstone, with extremely low permeability and containing clay minerals. When drilling and cementing with water-based fluids under an overbalanced condition in a shale formation without an effective flow barrier present at the wellbore wall, wellbore servicing fluid pressure will penetrate progressively into the formation. Because of the saturation and low permeability of a shale formation, penetration of a small volume of filtrate into the formation can result in a considerable increase in pore fluid pressure near the wellbore wall. The increase in pore fluid pressure can reduce the effective cement support, which leads to a less stable wellbore condition.

Therefore, a need exists for wellbore servicing fluids that reduce water absorption in subterranean formations comprised of argillaceous material. There also exists a need for a method of servicing a wellbore having argillaceous formations using an aqueous servicing fluid.

BRIEF SUMMARY OF SOME OF THE PREFERRED EMBODIMENTS

Disclosed herein is a method of servicing a wellbore in contact with a subterranean formation comprising placing an aqueous composition comprising a mud displacement fluid and a clay inhibitor into the wellbore.

Also disclosed herein is an aqueous composition for servicing a wellbore comprising a mud displacement fluid and a clay inhibitor.

Further disclosed herein is a method of servicing a wellbore comprising introducing an aqueous wellbore servicing fluid comprising a clay inhibitor, thereby inhibiting the swelling of an argillaceous subterranean formation penetrated by the wellbore.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

In an embodiment, an aqueous wellbore servicing fluid comprises a mud displacement fluid and a clay inhibitor. Herein, a mud displacement fluid refers to a fluid that displaces drilling mud. In embodiments, the mud displacement fluid may be a cementitious composition, a spacer fluid, or both. The aqueous wellbore servicing fluid may also optionally comprise a salt.

In an embodiment, the mud displacement fluid is a cementitious composition. The cementitious composition may comprise a cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

In an embodiment, the cementitious composition includes a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The cement compositions may comprise a density from about 4 lb/gallon to about 23 lb/gallon. In alternative embodiments, the cement compositions may comprise a density from about 12 lb/gallon to about 17 lb/gallon. In other alternative embodiments, the cement compositions may be low-density cement compositions with a density from about 6 lb/gallon to about 14 lb/gallon.

In some embodiments, additives may be included in the cementitious composition for improving or changing the properties thereof. Examples of such additives include but are not limited to salts, accelerants, set retarders, defoamers, fluid loss reducing agents, settling prevention agents, gas migration prevention additives, weighting materials, dispersants, vitrified shale, formation conditioning agents, or combinations thereof. Other mechanical property modifying additives, for example, carbon fibers, glass fibers, metal fibers, minerals fibers, thermoplastic elastomers such as styrene-butadiene or acrylonitrile-styrene-butadiene random or block polymers, and latex emulsions, for example styrene-butadiene latexes, and the like can be added to further modify the mechanical properties. These additives may be included singularly or in combination. Methods for introducing these additives and their effective amounts are known to one of ordinary skill in the art.

In an embodiment, the mud displacement fluid is a spacer fluid. Herein, spacer fluid refers to any fluid suitable for being placed between two fluids contained or to be pumped within a wellbore. In an embodiment, the spacer fluid comprises a base fluid, a surfactant, a weighting material agent, and a viscosifier.

The base fluid may comprise an aqueous-based fluid. Examples of suitable aqueous-based fluids include, without limitation, fresh water, salt water (e.g., water containing one or more salts dissolved therein), brine (e.g., saturated salt water), or seawater. The spacer fluid may comprise from about 20 to about 99 percent by volume of the base fluid.

In an embodiment, the spacer fluid may comprise at least one surfactant for stabilizing the spacer fluid in the wellbore. Herein, a surfactant refers to a chemical that acts as a surface-active agent, including but not limited to emulsifiers, dispersants, oil-wetters, water-wetters, foamers and defoamers. When a sufactant is included in the spacer fluid, it is intended to enhance the chemical compatibility of the spacer fluid with the other fluids and to water-wet downhole surfaces for an improved cement bond and better removal of well bore solids. The choice of a surfactant depends upon the type of compatibility desired, chemical capability with other fluids used in formation of the wellbore, and other wellbore design concerns. Without limitation, examples of suitable surfactants include tertiary alkyl amine ethoxylates, mixtures of ethoxylated alcohol ether sulfates, and alkyl or alkene amidopropylbetaine surfactants. The choice of surfactant, methods for introducing surfactant and their effective amounts are known to one of ordinary skill in the art.

In an embodiment, the spacer fluid comprises an effective amount of a weighting agent to increase its density such that it will subsequently exert a sufficient amount of hydrostatic pressure on a subterranean formation to prevent formation fluids from flowing out of the formation. The weighting material is included in the spacer fluid to increase its density for well control and increases the buoyancy effect of the spacer fluid on the gelled drilling fluid and filter cake adhered to the walls of the well bore. Examples of suitable weighting agents include barium sulfate, (i.e., barite), iron oxide (i.e., hematite), manganese oxide (i.e., hausmannite), and combinations thereof. Suitable weighting agents include without limitation, barite and hematite sold as BAROID weighting agent and HI-DENSE No. 4 (H-4) cement weighting additive by Halliburton Energy Services or a synthetic hausmannite sold as MICROMAX weighting agent by Elken Materials Inc. The amount of the weighting agent in the spacer fluid may be an amount effective to produce the desired density of the spacer fluid. Methods for introducing a suitable weighting agent and their effective amounts are known to one of ordinary skill in the art.

In an embodiment, the spacer fluid comprises a-viscosifier. Herein, a viscosifier refers to any agent that increases the viscosity of a fluid. Viscosifiers are intended to produce Theological properties, which provide suspended particle stability and fluid loss control to the spacer fluid. Suitable viscosifiers include, but are not limited to, clays; polymeric additives, whether natural or synthetic; modified cellulose and derivatives thereof, guar gum; diatomaceous earth; starches; and combinations thereof The choice of a viscosifier depends upon the viscosity desired, chemical capability with other fluids used in formation of the wellbore, and other wellbore design concerns. Methods for introducing the relevant type of viscosifier and their effective amounts are known to one of ordinary skill in the art.

In some embodiments, additives may be included in the spacer fluid for improving or changing the properties thereof Examples of such additional additives include, without limitation, fluid loss control agents, oxidizers, dispersants, suspending agents, pH increasing materials, pH decreasing materials, lost circulation materials (LCMs), gelling agents, and combinations thereof Methods for introducing suitable additives and their effective amounts are known to one skilled in the art.

In an embodiment, the aqueous wellbore servicing fluid comprises a clay inhibitor. Herein, a clay inhibitor refers to an agent with the ability to inhibit argillaceous formations from collapsing or losing integrity when the formations come in contact with an aqueous fluid. Without wishing to be being limited by theory, a clay inhibitor may minimize shale or clay hydration and thus prevent the absorption of water by downhole clay or shale formations to reduce a loss of wellbore stability.

In an embodiment, the clay inhibitor may be a polymer, alternatively, a nonionic polymer, alternatively, a nonionic polyacrylamide, alternatively, a low molecular weight nonionic polyacrylamide, alternatively a high molecular weight nonionic polyacrylamide. Herein, a low molecular weight nonionic polyacrylamide refers to a polyacrylamide with a molecular weight of less than two million, and a high molecular weight nonionic polyacrylamide refers to a polyacrylamide with a molecular weight of between 14 million to 16 million. In an embodiment, a clay/shale inhibitor may comprise an "inert element," and an "active element." Examples of the inert elements include, inter alia, water. The active element may substantially inhibit the degradation of clay and/or shale in the subterranean formation. The active element may comprise polymers derived from heterocyclic compounds further comprising nitrogen. In an embodiment, the polymers may or may not be crosslinked, alternatively, the polymers are crosslinked. In an embodiment, the active element of the clay inhibiting components comprises a polymeric heterocyclic nitrogen-containing compound present in an amount sufficient to inhibit degradation of shale in the subterranean formation. In one embodiment, the heterocyclic nitrogen-containing compound is straight chain polyvinyl pyrrolidone. In another embodiment, the heterocyclic nitrogen-containing compound is crosslinked polyvinyl pyrrolidone, Examples of suitable clay inhibitors include, without limitation, a low molecular weight nonionic polyacrylamide sold as CLAY SYNC shale stabilizer, a high molecular weight nonionic polyacrylamide sold as CLAY GRABBER polymeric additive and, a water soluble polymer that is sold as PERFORMATROL shale inhibitor, all of which are commercially available from Baroid Fluid Services.

In an embodiment, the clay inhibitor is present in the mud displacement fluid (e.g., a cementitious composition or spacer fluid) in amounts of about 0.1 to about 20 pounds per barrel of mix water, alternatively from about 0.1 to about 5 pounds per barrel of mix water, alternatively from about 1 to about 5 pounds per barrel of mix water, alternatively from about 1 to about 3 pounds per barrel of mix water, alternatively from about 2.5 to about 3.0 pounds per barrel of mix water. Methods of making a wellbore servicing fluid comprising a mud displacement fluid and a clay inhibitor are restrained only by any conditions imposed by a user. Order of addition, the reaction vessel, and the reaction conditions may be as deemed by one of ordinary skill in the art, depending on the desired physical properties of the mud displacement fluid or other wellbore servicing considerations.

In an embodiment, the aqueous wellbore servicing fluid comprises a salt. Without wishing to be limited by theory, the addition of salts to the disclosed compositions comprising a mud displacement fluid and a clay inhibitor may serve to increase the effectiveness of the clay inhibitor and to farther reduce the swelling of clay or shale formations which come into contact with the composition. As is known by one of ordinary skill in the art, salt may be included in a wellbore servicing fluid in order to slow the hydration of clay or shale in the formation. The nature and amount of the salt included are parameters that effect the extent of hydration of the clay or shale present in the formation.

The salt may be any compound containing a monovalent cation. Alternatively, the salt is an. alkali halide, alternatively sodium chloride, alternatively, potassium chloride. In an embodiment, the salt is sodium chloride and is present in the aqueous wellbore servicing fluid in amounts of from about 10% to saturation, alternatively of from about 0.1% to about 37%. For the salt solutions disclosed herein, the % refers to the weight/volume percentage of salt in water. In another embodiment, the salt is potassium chloride and is present in the aqueous wellbore servicing fluid in amnounts of from about 0.1% to about 10%, alternatively of from about 1% to about 8%, alternatively of from about 2% to about 5%, and alternatively of from about 0.1% to about 3%.

The aqueous wellbore servicing fluids disclosed are suitable for subterranean applications such as well completion and remedial operations. It is to be understood that "subterranean applications or workspaces" encompass both areas below exposed earth and areas below earth covered by water such as ocean or fresh water.

In an embodiment, the aqueous wellbore servicing fluid is a cementitious composition comprising a clay inhibitor. Such fluids may be used in various cementing operations wherein the cement is prepared, placed into a workspace, and allowed to set. In an embodiment, the cementitious compositions are used in various surface applications to cement a workspace at or above the ground, for example, a workspace encountered in the construction industry. In another embodiment, the cement is used in a subterranean workspace, for example, in cementing underground pipe such as sewer pipe or wellbore casing. In one embodiment, the cementitious compositions may be employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be placed down through the conduit and up through the annulus one or more times, for example, twice, to clean out the hole. The cementitious composition may then be conveyed downhole and up through the annulus, thereby displacing the drilling fluid from the wellbore. The cementitious composition sets into a hard mass, which forms a cement column that isolates an adjacent portion of the subterranean formation and provides support to the adjacent conduit.

In another embodiment, the cementitious composition may be employed in a secondary cementing operation such as squeeze cementing, which is performed after the primary cementing operation. In squeeze cementing, the cementitious composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The cementitious composition sets within the permeable zones, thereby forming a hard mass to plug those zones and prevent fluid from leaking therethrough.

In another embodiment, the cementitious composition may be used to form a kickoff plug. A kickoff plug is a hardened mass of cement that is used to change the direction of the borehole as it is being drilled.

The specific function of a kickoff plug is to cause the drill bit to divert its direction. Accordingly, if the plug is harder than the adjacent formation, then the drill bit will tend to penetrate the formation rather than the plug and thereby produce a change in drilling direction. Typically, a cement plug may be set in a borehole by pumping a volume of spacer fluid compatible with the drilling mud and cement slurry into the workstring. Then a predetermined volume of cement slurry is pumped behind the spacer fluid. The cement slurry travels down the workstring and exits into the wellbore to form the plug. The cement slurry typically exits through one or more openings located at the end of the workstring.

Methods of making and using a kickoff plug are also disclosed in U.S. Pat. Nos. 5,368,103 and 6,772,835, which are incorporated herein by reference in their entirety.

In another embodiment, the cementitous composition may be used to conduct a casing shoe test (CST). A casing shoe test, also known as a formation integrity test (FIT) or a leakoff test (LOT), is a pressure test applied to the formation directly below a casing shoe. The test is conducted to understand how the downhole formation reacts with the wellbore servicing fluid to determine the maximum pressures that may be safely applied without the risk of formation breakdown. The results of the test are used to design the wellbore servicing fluid program for the subsequent hole section and to set safe limits on casing shut-in or choke pressures for well-control purposes. Methods of conducting a casing shoe test are disclosed in U.S. Pat. Nos. 6,378,363 and 6,427,785, which are incorporated herein by reference in their entirety.

In an embodiment, the aqueous wellbore servicing fluid is a spacer fluid comprising a clay inhibitor. The spacer fluid may be placed in an annulus of a wellbore in any suitable manner. In an embodiment, the spacer fluid may be placed into the annulus directly from the surface. In another embodiment, the spacer fluid may be placed into the annulus by flowing through the casing into place in the annulus between the casing and the subterranean formation. Additional fluids such as cements may be circulated into place behind the spacer fluids.

Alternatively, a spacer fluid may be injected into the wellbore after the injection of the drilling fluid and before the injection of the cement slurry, wherein the spacer fluid is usually compatible with both the drilling fluid and the cement slurry. Alternatively, the spacer fluid may be placed between hydraulic cement slurries and drilling fluids, between two drilling fluids, and the like. Alternatively, a hydraulic cement slurry and drilling fluid are separated by a spacer fluid when the cement slurry is placed in the annulus between a pipe string and the walls of a wellbore. In an embodiment, the spacer fluid has a density sufficient to displace the drilling fluid from the wellbore. While one spacer fluid is typically displaced into the wellbore, it is to be understood that more than one spacer fluid may be used.

In an embodiment, a wellbore in contact with a subterranean formation may be serviced by placing downhole an aqueous mud displacement fluid comprising a clay inhibitor. Without being limited by theory, aqueous Swellbore servicing fluids comprising a clay inhibitor, and methods of using the same, may have an improved ability to prevent clay or shale formations from losing integrity and collapsing when in contact with the cement compositions or spacer fluids.

EXAMPLES

The invention having been generally described, the following examples are given as particular embodiments of the invention and to demonstrate the practice and advantages thereof It is understood that the examples are given by way of illustration and are not intended to limit the specification of the claims in any manner.

Example 1

Three different clay inhibitors, PERFORMATROL drilling fluid, CLAY GRABBER shale stabilizer, and CLAY SYNC shale stabilizer were compared to 4% glycol, a standard clay inhibitor, for their ability to inhibit the uptake of water by shale cuttings. For each clay inhibitor, two shale cuttings were weighed and their volume was determined by the Archimedes method. Typical drill cuttings were collected from a wellbore and then cast off a shale shaker with approximate dimensions of ¾ inch ¼ inch×⅛ inch. Each cutting was then placed in a350 ml solution containing water and the indicated clay inhibitor for 4 hours at 80 ° F. The concentration of clay inhibitor used is 0.5% CLAYGRABBER, 2 pounds per barrel (ppb) CLAYSYNC, and 14 ppb PERFORMATROL. Following exposure to the inhibitor solutions, the volume of the cuttings was redetermined. The initial and final volumes of each cutting were used to calculate the volume swelling. The results are given in Table 1. Hereafter, % refers to the weight/volume percent of the component in the aqueous solution.

TABLE 1

| Clay Inhibitor | Cutting No. | Before | | | After | | | Calculations | | |
| --- | --- | --- | --- | --- | --- | --- | --- | --- | --- | --- |
| | | Weight | Volume | Density | Weight | Volume | Density | Density Loss | Volume Gain | Volume Swell |
| PERFOMATROL drilling fluid | Cutting 1 | 6.2 | 2.9 | 17.8 | 7.6 | 4.3 | 14.7 | 3.1 | 1.4 | 48.3 |
| | Cutting 2 | 4.6 | 2.2 | 17.4 | 6.7 | 4.3 | 13.0 | 4.4 | 2.1 | 95.5 |
| CLAY GRABBER shale stabilizer | Cutting 1 | 7.1 | 3.3 | 17.9 | 9.1 | 5.3 | 14.3 | 3.6 | 2.0 | 60.6 |
| | Cutting 2 | 5.3 | 2.6 | 17.0 | | | | | | |
| CLAY SYNC shale stabilizer | Cutting 1 | 4.4 | 2.0 | 18.3 | 6.0 | 3.7 | 13.5 | 4.8 | 1.7 | 85.0 |
| | Cutting 2 | 4.7 | 2.2 | 17.8 | 6.3 | 3.8 | 13.8 | 4.0 | 1.6 | 72.7 |
| 4% Glycol | Cutting 1 | 9.1 | 4.2 | 18.0 | 11.3 | 6.4 | 14.7 | 3.3 | 2.2 | 52.4 |

The results demonstrate that shale cuttings exposed to water in the presence of a clay inhibitor such as CLAY GRABBER shale stabilizer or CLAY SYNC shale stabilizer had a volume gain less than the volume gain observed when using 4% glycol as the clay inhibitor.

Example 2

The effect of salt on the function of the clay inhibitors was determined. The volume gain of shale cuttings exposed to solutions containing the aforementioned clay inhibitors and either 5% KCl (Table 2) or 37% NaCl (Table 3) were determined under the conditions described in Example 1. The volume gain for shale cuttings exposed to the clay inhibitors in the presence of salt was compared to shale cuttings exposed to a fresh water solution denoted as "No Additives" in Tables 2 and 3.

TABLE 2

| Clay Inhibitor | Cutting No. | Before Weight | Before Volume | Before Density | After Weight | After Volume | After Density | Calculations Density Loss | Calculations Volume Gain | Calculations Volume Swell |
|---|---|---|---|---|---|---|---|---|---|---|
| No Additives | Cutting 1 | 4.7 | 2.2 | 17.8 | 5.5 | 3.1 | 14.8 | 3.0 | 0.9 | 40.9 |
|  | Cutting 2 | 6.7 | 3.1 | 18.0 | 7.8 | 4.3 | 15.1 | 2.9 | 1.2 | 38.7 |
| PERFORMATROL drilling fluid | Cutting 1 | 3.7 | 1.8 | 17.1 | 4.3 | 2.4 | 14.9 | 2.2 | 0.6 | 33.3 |
|  | Cutting 2 | 2.8 | 1.5 | 15.5 | 3.1 | 1.7 | 15.2 | 0.4 | 0.2 | 13.3 |
| CLAY GRABBER shale stabilizer | Cutting 1 | 6.1 | 2.8 | 18.1 | 7.2 | 3.9 | 15.4 | 2.8 | 1.1 | 39.3 |
|  | Cutting 2 | 3.3 | 1.6 | 17.2 | 3.7 | 1.9 | 16.2 | 1.0 | 0.3 | 18.8 |
| CLAY SYNC shale stabilizer | Cutting 1 | 4.1 | 2 | 17.1 | 4.9 | 2.6 | 15.7 | 1.4 | 0.6 | 30.0 |
|  | Cutting 2 | 6 | 2.7 | 18.5 | 6.5 | 3.2 | 16.9 | 1.6 | 0.5 | 18.5 |
| 4% Glycol | Cutting 1 | 4.4 | 2 | 18.3 | 5.2 | 2.7 | 16.0 | 2.3 | 0.7 | 35.0 |
|  | Cutting 2 | 7.4 | 3.4 | 18.1 | 8.3 | 4.3 | 16.1 | 2.1 | 0.9 | 26.5 |

TABLE 3

| Clay Inhibitor | Cutting No. | Before Weight | Before Volume | Before Density | After Weight | After Volume | After Density | Calculations Density Loss | Vol Gain | Vol Swell |
|---|---|---|---|---|---|---|---|---|---|---|
| No additives | Cutting 1 | 6.4 | 3.0 | 17.8 | 6.7 | 3.3 | 16.9 | 0.9 | 0.3 | 10.0 |
|  | Cutting 2 | 5.9 | 2.7 | 18.2 | 6.2 | 3.0 | 17.2 | 1.0 | 0.3 | 11.1 |
| PERFORMATROL drilling fluid | Cutting 1 | 4.3 | 2.1 | 17.1 | 4.5 | 2.3 | 16.3 | 0.8 | 0.2 | 9.5 |
|  | Cutting 2 | 2.9 | 1.5 | 16.1 | 3.4 | 1.8 | 15.7 | 0.4 | 0.3 | 20.0 |
| CLAY GRABBER shale stabilizer | Cutting 1 | 3.8 | 1.8 | 17.6 | 4.2 | 2.1 | 16.7 | 0.9 | 0.3 | 16.7 |
|  | Cutting 2 | 6.0 | 2.8 | 17.9 | 6.5 | 3.3 | 16.4 | 1.4 | 0.5 | 17.9 |
| CLAY SYNC shale stabilizer | Cutting 1 | 3.0 | 1.5 | 16.7 | 3.5 | 1.7 | 17.2 | −0.5 | 0.2 | 13.3 |
|  | Cutting 2 | 3.1 | 1.5 | 17.2 | 3.4 | 1.7 | 16.7 | 0.6 | 0.2 | 13.3 |
| 4% Glycol | Cutting 1 | 2.4 | 1.2 | 16.7 | 2.5 | 1.2 | 17.4 | −0.7 | 0.0 | 0.0 |
|  | Cutting 2 | 9.4 | 4.4 | 17.8 | 9.8 | 4.7 | 17.4 | 0.4 | 0.3 | 6.8 |

The results demonstrate that the addition of either KCl or NaCl to solutions of clay inhibitors further improves the ability of the clay inhibitors to reduce the absorption of aqueous fluid by shale.

Comparative Example 1

The ability of an aqueous solution comprised of the clay inhibitor PERFORMATROL drilling fluid and 18% NaCl to inhibit the absorption of shale cuttings was compared to the inhibitory effect of 4% glcol water, and a solution containing a viscosifying agent, Table 4. The viscosifying agent used was xantham gum in a concentration range of 0.5 ppb to 1.0 ppb. Viscosifiers may be included in a drilling fluid for a variety of reasons, including for example to aid in the carrying of material and mud out of the wellbore.

The results demonstrate that an improved inhibition of water absorption is observed for cuttings exposed to a solution containing the clay inhibitor PERFORMATROL drilling fluid and 18% NaCl when compared to the volume increase observed in the presence of water or water and a viscosifying agent.

Example 3

The effect of temperature on the function of the clay inhibitors was determined. The volume gain of shale cuttings exposed to solutions containing the clay inhibitor PERFORMATROL drilling fluid was compared to the volume gain for shale cuttings exposed to either 4% or 8% of the clay inhibitor glycol. The reactions were carried out at 140° F. and in the presence of 37% NaCl but were otherwse as described in Example 1. Table 5 gives the results of this experiment.

TABLE 4

| Clay Inhibitor | Cutting No. | Before Weight | Before Volume | Before Density | After Weight | After Volume | After Density | Calculations Density Loss | Calculations Volume Gain | Calculations Volume Swell |
|---|---|---|---|---|---|---|---|---|---|---|
| 4% Glycol | Cutting 1 | 5.9 | 2.8 | 17.6 | 6.4 | 3.3 | 16.2 | 1.4 | 0.5 | 17.9 |
|  | Cutting 2 | 3.8 | 1.8 | 17.6 | 4.0 | 2.0 | 16.7 | 0.9 | 0.2 | 11.1 |
| 4% PERFORMATROL drilling fluid | Cutting 1 | 7.0 | 3.2 | 18.2 | 7.2 | 3.5 | 17.1 | 1.1 | 0.3 | 9.4 |
|  | Cutting 2 | 4.5 | 2.2 | 17.0 | 4.8 | 2.4 | 16.7 | 0.4 | 0.2 | 9.1 |
| Water | Cutting 1 | 3.5 | 1.7 | 17.2 | 5.4 | 3.6 | 12.5 | 4.7 | 1.9 | 111.8 |
|  | Cutting 2 | 7.9 | 3.6 | 18.3 | 9.4 | 5.8 | 13.5 | 4.8 | 2.2 | 61.1 |
| Viscosifying Agent | Cutting 1 | 4.1 | 1.9 | 18.0 | 4.7 | 2.6 | 15.1 | 2.9 | 0.7 | 36.8 |
|  | Cutting 2 | 10.0 | 4.6 | 18.1 | 9.9 | 5.4 | 15.3 | 2.8 | 0.8 | 17.4 |

TABLE 5

| Clay Inhibitor | Cutting No. | Before | | | After | | | Calculations | | |
|---|---|---|---|---|---|---|---|---|---|---|
| | | Weight | Volume | Density | Weight | Volume | Density | Density Loss | Vol Gain | Vol Swell |
| 4% Glycol | Cutting 1 | 7.1 | 3.2 | 18.5 | 7.6 | 3.6 | 17.6 | 0.9 | 0.4 | 12.5 |
| | Cutting 2 | 4.0 | 1.9 | 17.5 | 4.4 | 2.4 | 15.3 | 2.3 | 0.5 | 26.3 |
| PERFORMATROL | Cutting 1 | 8.9 | 4.1 | 18.1 | 9.3 | 4.5 | 17.2 | 0.9 | 0.4 | 9.8 |
| drilling fluid | Cutting 2 | 8.3 | 3.7 | 18.7 | 8.5 | 4.0 | 17.7 | 1.0 | 0.3 | 8.1 |
| 8% Glycol | Cutting 1 | 7.1 | 3.3 | 17.9 | 7.7 | 3.9 | 16.4 | 1.5 | 0.6 | 18.2 |
| | Cutting 2 | 4.7 | 2.2 | 17.8 | 5.0 | 2.5 | 16.7 | 1.1 | 0.3 | 13.6 |

The results demonstrate that an improved inhibition of water absorption is observed for cuttings exposed to a solution containing a clay inhibitor at 140° F.

Example 5

The effect of salt concentration on the function of the clay inhibitors was determined The effect of 4% glycol and PERFORMATROL drilling fluid, in the presence of either 37% or 18% NaCl on the fluid absorption of shale cuttings was determined in duplicate, Tables 6 and 7. The experiments were carried out in as described in Example 1.

The results demonstrate that an improved inhibition of water absorption by shale when using solutions containing the clay inhibitor PERFORMATROL drilling fluid and 37% NaCl as compared to solutions containing PERFORMATROL drilling fluid and 18% NaCl.

Example 6

The volume of swelling of shale cuttings was determined in the same manner as in Example 1. Two clay inhibitors, 4% glycol and PERFORMATROL drilling fluid, were each tested, along with a trial using only fresh water in the 350 mL

TABLE 6

| Clay Inhibitor | Cutting No. | Before | | | After | | | Calculations | | |
|---|---|---|---|---|---|---|---|---|---|---|
| | | Weight | Volume | Density | Weight | Volume | Density | Density Loss | Vol Gain | Vol Swell |
| | | | | 37% Salt | | | | | | |
| 4% Glycol | Cutting 1 | 4.8 | 2.3 | 17.4 | 5.4 | 2.8 | 16.1 | 1.3 | 0.5 | 21.7 |
| | Cutting 2 | 8.1 | 3.8 | 17.8 | 8.8 | 4.4 | 16.7 | 1.1 | 0.6 | 15.8 |
| PERFORMATROL | Cutting 1 | 6.5 | 3.0 | 18.0 | 6.7 | 3.2 | 17.4 | 0.6 | 0.2 | 6.7 |
| drilling fluid | Cutting 2 | 7.5 | 3.5 | 17.9 | 7.8 | 3.7 | 17.6 | 0.3 | 0.2 | 5.7 |
| | | | | 18% Salt | | | | | | |
| 4% Glycol | Cutting 1 | 5.1 | 2.4 | 17.7 | 5.4 | 2.7 | 16.7 | 1.0 | 0.3 | 12.5 |
| | Cutting 2 | 5.8 | 2.7 | 17.9 | 6.3 | 3.0 | 17.5 | 0.4 | 0.3 | 11.1 |
| PERFORMATROL | Cutting 1 | 8.9 | 4.1 | 18.1 | 10.0 | 5.1 | 16.3 | 1.7 | 1.0 | 24.4 |
| drilling fluid | Cutting 2 | 3.9 | 1.8 | 18.0 | 4.5 | 2.4 | 15.6 | 2.4 | 0.6 | 33.3 |

TABLE 7

| Clay Inhibitor | Cutting No. | Before | | | After | | | Calculations | | |
|---|---|---|---|---|---|---|---|---|---|---|
| | | Weight | Volume | Density | Weight | Volume | Density | Density Loss | Vol Gain | Vol Swell |
| | | | | 37% Salt | | | | | | |
| 4% Glycol | Cutting 1 | 5.3 | 2.5 | 17.7 | 5.6 | 2.8 | 16.7 | 1.0 | 0.3 | 12.0 |
| | Cutting 2 | 3.8 | 1.8 | 17.6 | 4.0 | 1.9 | 17.5 | 0.0 | 0.1 | 5.6 |
| 4% PERFORMATROL | Cutting 1 | 3.0 | 1.4 | 17.9 | 3.4 | 1.8 | 15.7 | 2.1 | 0.4 | 28.6 |
| drilling fluid | Cutting 2 | 2.7 | 1.3 | 17.3 | 3.0 | 1.6 | 15.6 | 1.7 | 0.3 | 23.1 |
| | | | | 18% Salt | | | | | | |
| 4% Glycol | Cutting 1 | 3.9 | 1.8 | 18.0 | 4.3 | 2.2 | 16.3 | 1.8 | 0.4 | 22.2 |
| | Cutting 2 | 4.4 | 2.0 | 18.3 | 4.7 | 2.3 | 17.0 | 1.3 | 0.3 | 15.0 |
| 4% PERFORMATROL | Cutting 1 | 3.7 | 1.8 | 17.1 | 4.1 | 2.1 | 16.3 | 0.9 | 0.3 | 16.7 |
| drilling fluid | Cutting 2 | 3.2 | 1.6 | 16.7 | 3.5 | 1.8 | 16.2 | 0.5 | 0.2 | 12.5 | solution as a control. In this example, sodium chloride was present in each 350 mL solution in an amount equal to ten percent weight of water. Table 8 below shows the results of this test.

TABLE 8

| Clay Inhibitor | Cutting No. | Before | | | After | | | Calculations | | |
| --- | --- | --- | --- | --- | --- | --- | --- | --- | --- | --- |
| | | Weight | Volume | Density | Weight | Volume | Density | Density Loss | Vol Gain | Vol Swell |
| Fresh | Cutting 1 | 5.3 | 2.6 | 17.0 | 6.4 | 3.6 | 14.8 | 2.2 | 1.0 | 38.5 |
| | Cutting 2 | 6.3 | 2.9 | 18.1 | 7.6 | 4.2 | 15.1 | 3.0 | 1.3 | 44.8 |
| 4% Glycol | Cutting 1 | 3.9 | 1.8 | 18.0 | 5.0 | 2.9 | 14.4 | 3.7 | 1.1 | 61.1 |
| | Cutting 2 | 3.9 | 1.8 | 18.0 | 5.0 | 2.8 | 14.9 | 3.2 | 1.0 | 55.6 |
| 4% PERFORMATROL drilling fluid | Cutting 1 | 6.8 | 3.2 | 17.7 | 8.0 | 4.3 | 15.5 | 2.2 | 1.1 | 34.4 |
| | Cutting 2 | 5.9 | 2.7 | 18.2 | 6.5 | 3.2 | 16.9 | 1.3 | 0.5 | 18.5 |

The results demonstrate that the addition of sodium chloride inhibits the swelling of shale cuttings.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation comprising:
    placing an aqueous composition comprising a mud displacement fluid; a surfactant and a clay inhibitor into the wellbore,
wherein the surfactant comprises tertiary alkyl amine ethoxylates, mixtures of ethoxylated alcohol ether sulfates, and alkyl or alkene amidopropylbetaine surfactants, wherein the clay inhibitor is a nonionic polyacrylamide, a low molecular weight nonionic polyacrylamide, a high molecular weight nonionic polyacrylamide, a polymeric heterocyclic nitrogen-containing compound, polyvinyl pyrrolidone or combinations thereof, wherein the polyvinyl pyrrolidone is a straight chain polyvinyl pyrrolidone, a crosslinked polyvinyl pyrrolidone or combinations thereof, and wherein the mud displacement fluid is a spacer fluid.

2. The method of claim 1 wherein the spacer fluid comprises a base fluid, a weighting agent, and a viscosifier.

3. The method of claim 2 wherein the base fluid is present in an amount of from about 20 to about 90% by volume of the spacer fluid.

4. The method of claim 2 wherein the weighting agent comprises barium sulfate, iron oxide, manganese oxide, and combinations thereof.

5. The method of claim 2 wherein the viscosifier comprises clays; natural polymeric additives, synthetic polymeric additives; modified cellulose and derivatives thereof; guar gum; diatomaceous earth; starches; and combinations thereof.

6. The method of claim 1 wherein the clay inhibitor is present in amounts of from about 0.1 pounds per barrel of spacer fluid to about 20 pounds per barrel of spacer fluid.

7. The method of claim 1 wherein the aqueous composition further comprises a salt.

8. The method of claim 7 wherein the salt is an alkali halide.

9. The method of claim 8 wherein the alkali halide is potassium chloride, sodium chloride or combinations thereof.

10. The method of claim 8 wherein the salt is sodium chloride and is present in an amount of from about 10 w/v % to about saturation.

11. The method of claim 8 wherein the salt is potassium chloride and is present in an amount of from about 0.1 w/v % to about 10 w/v %.

12. The method of claim 1 wherein the aqueous composition further comprises a mechanical property modifying additive.

13. A method of servicing a wellbore in contact with a subterranean formation comprising:
    placing an aqueous composition comprising a mud displacement fluid, a surfactant and a clay inhibitor into the wellbore,
wherein the surfactant comprises tertiary alkyl amine ethoxylates, mixtures of ethoxylated alcohol ether sulfates, and alkyl or alkene amidopropylbetaine surfactants, wherein the clay inhibitor is a nonionic polyacrylamide, a low molecular weight nonionic polyacrylamide, a high molecular weight nonionic polyacrylamide, a polymeric heterocyclic nitrogen-containing compound, polyvinyl pyrrolidone or combinations thereof, wherein the polyvinyl pyrrolidone is a straight chain polyvinyl pyrrolidone, a crosslinked polyvinyl pyrrolidone or combinations thereof, and wherein the mud displacement fluid is a cementitious composition.

14. The method of claim 13 wherein the cementitious composition comprises cement and water.

15. The method of claim 14 wherein the cement comprises Portland cements, pozzolana cements, gypsum cements, phosphate cements, high alumina cements, silica cements, high alkalinity cements and combinations thereof.

16. The method of claim 13 wherein the clay inhibitor is present in amounts of from about 0.1 pounds per barrel of mix water to about 20 pounds per barrel of mix water.

17. A method of servicing a wellbore comprising:
introducing an aqueous wellbore servicing fluid comprising a clay inhibitor and a surfactant, thereby inhibiting the swelling of an argillaceous subterranean formation penetrated by the wellbore, wherein the surfactant comprises tertiary alkyl amine ethoxylates, mixtures of ethoxylated alcohol ether sulfates, and alkyl or alkene amidopropylbetaine surfactants, wherein the clay inhibitor is a nonionic polyacrylamide, a low molecular weight nonionic polyacrylamide, a high molecular weight nonionic polyacrylamide or combinations thereof, and wherein the aqueous servicing fluid comprises cement and water.

18. The method of claim 17 wherein the cement comprises Portland cements, pozzolana cements, gypsum cements, phosphate cements, high alumina cements, silica cements, high alkalinity cements, and combinations thereof.

19. The method of claim 17 wherein the water is present in an amount from about 20 to about 180 percent by weight of cement.

20. The method of claim 17 wherein the cement composition has a density from about 4 lb/gallon to about 23 lb/gallon.

21. A method of servicing a wellbore in contact with a subterranean formation comprising: placing an aqueous composition comprising a mud displacement fluid and a nonionic polyacrylamide clay inhibitor into the wellbore wherein the mud displacement fluid comprises cement, a surfactant, and water, and wherein the surfactant comprises tertiary alkyl amine ethoxylates, mixtures of ethoxylated alcohol ether sulfates, and alkyl or alkene amidopropylbetaine surfactants.

22. A method of servicing a wellbore in contact with a subterranean formation comprising: placing an aqueous composition comprising a mud displacement fluid and a nonionic polyacrylamide clay inhibitor into the wellbore wherein the aqueous composition comprises a spacer fluid, wherein the spacer fluid comprises a base fluid, a surfactant, a weighting agent, and a viscosifier; wherein the surfactant comprises tertiary alkyl amine ethoxylates, mixtures of ethoxylated alcohol ether sulfates, and alkyl or alkene amidopropylbetaine surfactants; wherein the weighting agent comprises barium sulfate, iron oxide, manganese oxide, and combinations thereof; and wherein the viscosifier comprises clays; natural polymeric additives, synthetic polymeric additives; modified cellulose and derivatives thereof; guar gum; diatomaceous earth; starches; and combinations thereof.

* * * * *